United States Patent [19]

Larsen et al.

[11] 4,127,516

[45] Nov. 28, 1978

[54] HYDROPHILIC POLYURETHANE FOAMS WITH GOOD WET STRENGTH

[75] Inventors: Donald W. Larsen, Marriottsville; Louis L. Wood, Rockville, both of Md.

[73] Assignee: W. R. Grace & Co., New York, N.Y.

[21] Appl. No.: 772,942

[22] Filed: Feb. 28, 1977

[51] Int. Cl.² .................... C08G 18/14; C08G 18/54
[52] U.S. Cl. ................. 521/137; 260/29.2 TN; 260/859 R; 521/159; 521/164; 521/167; 521/905
[58] Field of Search ............... 260/2.5 AD, 2.5 AM, 260/2.5 AK, 29.2 TN, 2.5 BE

[56] References Cited

U.S. PATENT DOCUMENTS

| | | | |
|---|---|---|---|
| 3,002,937 | 10/1961 | Parker et al. ........................ 260/2.5 |
| 3,836,493 | 9/1974 | Matsuda et al. ............. 260/29.2 TN |
| 3,854,535 | 12/1974 | Kehr et al. ............................ 169/48 |
| 3,892,696 | 7/1975 | Wood ........................... 260/29.2 TN |
| 3,903,232 | 9/1975 | Wood et al. .............. 260/2.5 AD X |
| 3,939,105 | 2/1976 | Jones et al. ............... 260/2.5 AD X |
| 3,940,542 | 2/1976 | Kerupf et al. ............. 260/2.5 AD X |
| 3,953,406 | 4/1976 | Marsh ....................... 260/2.5 AD X |
| 4,073,840 | 2/1978 | Saidla .................................. 264/45.3 |

OTHER PUBLICATIONS

Kirk-Othmer—Encyclopedia of Chemical Technology, 2nd Edition, vol. 9, (1966), p. 849.

*Primary Examiner*—H.S. Cockeram
*Attorney, Agent, or Firm*—Richard P. Plunkett; Phillip M. Pippenger

[57] ABSTRACT

Disclosed herein is a polyurethane foam having good wet strength. The foam is prepared by reacting a urethane prepolymer with large amounts of water containing a poly(amino)urea and optionally other ingredients, e.g. surfactants. The poly(amino)urea is characterized as being the water soluble reaction product of a polyamine with a urethane prepolymer, said reaction product being further reacted with a crosslinking agent, e.g. epichlorohydrin.

16 Claims, No Drawings

HYDROPHILIC POLYURETHANE FOAMS WITH GOOD WET STRENGTH

BACKGROUND OF THE INVENTION

Preparation of poly(amino)urea polymers is well known. U.S. Pat. No. 3,892,696 teaches reaction of polyisocyanates with polyamines in the presence of a carbonyl solvent to produce essentially linear polyureas. After replacing the carbonyl solvent with water, the polyurea can be further reacted with crosslinking agents, e.g. epichlorohydrin or formalin, to provide partially crosslinked polymers which are still water soluble or water dispersible. Polyureas have also been described wherein the reaction with the crosslinking agent is carried out in the carbonyl solvent (see U.S. Pat. No. 3,836,493).

In addition to U.S. Pat. No. 3,892,696 other polyurea systems are also known which are based on a mixture of ketamines or aldimines with polyisocyanates. Such mixtures are stable in the absence of moisture and may be applied as coatings to various substrates. Application of moisture causes unblocking of the ketamines or aldimines to yield free primary amines which react with the polyisocyanates to provide a cured, hard polyurea coating. Illustrative of patents describing such systems are Australian Pat. No. 285,476 and Australian application No. 12,091/66. Also relevant are British Pat. Nos. 1,259,574; 1,125,836; 1,073,209 and 1,088,534. Coating compositions formed by reacting urethane prepolymers with polyamines are also described in U.S. Pat. No. 3,475,266.

Another system useful as wet strength agents is the polyamide formed by reacting adipic acid with diethylene triamine followed by reaction with epichlorohydrin and adjustment of pH to about 5.5 to provide a poly(amino) polyamide wherein the amine groups have been converted to the hydrochloride salt. Such products are described in U.S. Pat. No. 2,926,116.

DESCRIPTION OF THE INVENTION

The invention is a hydrophilic foam having good wet strength prepared by reacting, under foam-forming conditions a urethane prepolymer and an aqueous dispersion of an essentially linear polyurea which has been further reacted with a crosslinking agent, e.g. epichlorohydrin or formalin. By foam-forming conditions it is meant that an aqueous phase is simply admixed with the urethane prepolymer. Reaction between water and isocyanate groups automatically causes foaming of the mixture. The urethane prepolymer is the reaction product of a hydrophilic oxyalkylene polyol with a polyisocyanate such as toluene diisocyanate (TDI) or the other polyisocyanates described herein below.

The polyurea is the reaction product of a polyisocyanate with a polyamine such as diethylene triamine. Preferably however the polyisocyanate is an essentially linear polyol which has been capped with a polyisocyanate such as TDI, i.e. a prepolymer, as described.

In preparing the foams the amount of polyurea/crosslinker adduct employed is from about 0.1 to about 5 parts by weight, based on the weight of the prepolymer. Generally the adduct is water soluble and is employed in the form of an aqueous solution containing from about 5 to 40 weight percent of the adduct. In mixing the adduct with the prepolymer the reaction conditions are not critical, e.g. the reaction can be carried out at room temperature using hand stirring or mechanical agitation to mix the prepolymer and aqueous phases. Surfactants can be dissolved in the aqueous phase of the polyurea solution. Suitable surfactants include low molecular weight copolymers of propylene and ethylene oxide (Pluronic ® surfactants sold by BASF Wyandotte); $C_8$–$C_{20}$ straight and branched chain fatty alcohols chain extended with 2-20 oxyethylene units (Brij ® surfactants sold by ICI United States); nonhydrolizable silicone surfactants (L-540, Union Carbide; and DC-190, Dow Corning); hydrolizable silicone surfactants (L-520, Union Carbide); and silicone sulfate esters of alkyl phenoxy polyoxyethylene ethanol and anionic fluorochemical surfactants (Monflor 31, ICI Ltd.).

To maximize wet strength it is desirable to dry the foams. Ordinary drying conditions can be employed such as heating the foams at 70° C. for from about 1 to 48 hours depending upon the volume of the foam.

The properties of the foams can be further modified by incorporating fibers into the aqueous polyurea solution prior to the foaming reaction. The amount of fiber employed is not critical but depends upon the type and extent of properties desired. If the fiber concentration is too great it is difficult to admix the polyurea and prepolymer phases. If the amount of fiber employed is too small, the desired effect will not be accomplished. Examples of suitable fibers include: rayon, polyester, polyamide, polyvinyl chloride, polyvinyl alcohol, polyacrylonitrile, polyethylene, polypropylene, and copolymers of the above, also natural fibers, e.g. wood pulp and cotton, and their derivatives (Na carboxymethylated or hydroxyethylated). Fiber dimensions run from ⅛" to 1" long and 1 to 15 denier per foot, with optimum dimensions being ¼" to ½" by 1.5 to 12 denier. Depending upon the nature of the fibers employed the foams can be reinforced and such properties as hydrophilicity (as exemplified by wicking action) can be increased.

URETHANE PREPOLYMERS

Suitable urethane prepolymers for reaction with the polyurea adduct are prepared by capping a polyoxyalkylene polyol with an excess of polyisocyanate, e.g. toluene diisocyanate. Prior to capping the polyol should have a molecular weight of from about 200 to about 20,000, and preferably from about 600 to about 6,000. The hydroxy functionality of the polyol and the corresponding isocyanate functionality following capping is from 2 to about 8. If foams are formed from prepolymers with an isocyanate functionality of about 2 the resulting foam is essentially linear and does not have as much tensile strength since there is little or no crosslinking. Accordingly, if the isocyanate functionality is about 2 a crosslinker should be employed. Suitable crosslinkers for isocyanates are well known in the polyurethane art and include by way of example tolylene-2,4,6-triamine, ethylene diamine, diethanolamine, diethylenetriamine, triethylene-tetramine, tetraethylenepentamine, and ethanolamine.

Examples of suitable polyols (to be capped with polyisocyanates) include: (A) essentially linear polyols formed for example by reaction of ethylene oxide with ethylene glycol as an initiator. Mixtures of ethylene oxide with other alkylene oxides can be employed so long as the mole percent of ethylene oxide is at least 40 percent. Desirably at least 60 and preferably at least 75 mole % of ethylene oxide is employed. As stated, it may be desirable to use isocyanate crosslinkers with these systems in which case the isocyanate crosslinker can be included in the water into which the prepolymer is dispersed. Where the linear polyethers are mixtures of ethylene oxide with, e.g. propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C) linear branched polyfunctional polyols as exemplified in A and B above together with an initiator or crosslinker. A specific example of C is a mixture of polyethylene glycol (m.w. about 1,000) with trimethylolpropane, trimethylolethane or glycerine. This mixture can be subsequently reacted with excess polyisocyanate to provide a prepolymer useful in the invention. Alternatively the linear or branched polyols, (e.g. polyethylene glycol) can be reacted separately with excess polyisocyanate. The initiator, e.g. trimethylolpropane, can also be separately reacted with polyisocyanate. Subsequently the two capped materials can be combined to form the prepolymer.

Suitable polyisocyanates useful in preparing prepolymers include toluene-2,4-diisocyanate, toluene-2,6-diisocyanate, commercial mixtures of toluene-2,4- and 2,6-diisocyanates, cyclohexylene-1,4-diisocyanate, m-phenylene diisocyanate, 3,3'-diphenyl-4,4'-biphenylene diisocyanate, 4,4'-biphenylene diisocyanate, 1,6-hexamethylenediisocyanate, 1,5-naphthalenediisocyanate, cumene-2,4-diisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, 9,10-anthracenediisocyanate, 2,4-diisocyanatostilbene, 1,4-anthracenediisocyanate, 2,4,6-toluenetriisocyanate, isophorone diisocyanate, and p,p'p''-triphenylmethane triisocyanate.

Suitable initiators useful in preparing prepolymers include propylene glycol, trimethylene glycol, 1,2-butylene glycol, 1,3-butanediol, 1,4-butanediol, 1,5-pentanediol, 1,2-hexane glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, 1,2,6-hexanetriol, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)methyl-pentanediol-1,5,1,1,1-tris[(2-hydroxyethoxy)methyl]ethane, 1,1,1-tris[(2-hydroxypropoxy)methyl]propane, triethanolamine, triisopropanolamine, resorcinol, pyrogallol, phloroglucinol, hydroquinone, 4,6-di-tertiarybutyl catechol, catechol, and resorcinol.

POLYUREA ADDUCTS

The polyurea adducts are prepared by reacting polyisocyanates (preferably linear polyoxyalkylene polyols capped with polyisocyanates) with polyamines in a reaction moderating solvent. Subsequently the polyureas are reacted with a crosslinking agent such as epichlorohydrin. This subsequent reaction can be carried out in the moderating solvent or after the moderating solvent has been replaced by water. Recognizing that the reaction mechanism may be subject to speculation, it appears that the polyureas are formed because the moderating solvent such as a ketone or aldehyde forms complexes or weakly bonded compounds with the polyamines thus slowing down what otherwise would be an instantaneous reaction with the isocyanate groups. Useful polyurea adducts are prepared as described in U.S. Pat. No. 3,892,696 which is hereby incorporated in full into the present specification.

Polyamines, such as diethylene triamine, may be reacted with from equal molar amounts to large excesses of a moderating solvent such as ketone or aldehyde solvents. Examples of these solvents include acetone, methyl ethyl ketone, cyclohexanone, acetaldehyde, propionaldehyde, butyraldehyde, isobutyraldehyde and the like. The reaction preferably may be effected for times ranging from about 2 minutes to about 24 hours, i.e. aging at a temperature of about $-5°$ C. to about $150°$ C. To the resultant solution then maintained at a temperature of about $0°$ C. to about $25°$ C. is added a cold solution of polyisocyanate at a temperature in the range of about $0°$ C. to about $25°$ C. disposed in a similar solvent. The molar ratio of isocyanate groups to amine groups is from about 1:1.1 to about 1:20 as desired. Ratios of from 3:4 to 1.2 are preferred. It is necessary to include an excess of polyamine over the isocyanate such that the resultant polyureas contain free amino groups available for further reaction with the crosslinker.

After stirring the reactants at about $0°$ C. to about $100°$ C. for about 2 minutes to about 8 hours, polymerization is complete and a solution or slurry of essentially non-crosslinked polyureas results.

To form an aqueous dispersion the carbonyl solvent is substantially removed (e.g. by distillation) and replaced with water. The polyurea is soluble in the water and is further reacted with a crosslinking agent. To accomplish this reaction the crosslinker is admixed into the aqueous phase and allowed to react with amino groups in the polyurea chain. During reaction the pH is maintained below 8 to minimize crosslinking. The amount of crosslinker employed should be sufficient to provide from about 0.2 to about 2 moles and preferably from about 0.8 to about 1.5 moles of reactive groups for each mole of amine present in the polyurea. Such reactive groups include oxirane, labile carbonyl hydrogen, and labile halogen. Examples of suitable crosslinking agents include epichlorohydrin, formaldehyde, 1,4-dichlorobutene-2, B,B'-dichloroethylether, acetaldehyde, chloral and similar reagents.

Aqueous solutions of polyurea/crosslinker adducts useful in the present invention have a pH of from about 4 to about 6, a viscosity of from about 200 to about 20,000 and the concentration of adduct is from about 5 to about 45 weight percent. Prior to admixture with the prepolymer to initiate foaming, the aqueous solutions are generally diluted to about 5–20% and surfactants, fibers, etc., are incorporated as desired. The term "% solids" is sometimes employed in describing the loading of polyurea adducts in the aqueous phase, and is synonymous with the term weight percent. The viscosity of the aqueous solutions is determined on a standard Brookfield viscometer (LTV spindle 4 at $25°$ C.). The polyurea/crosslinker adducts useful in the invention may be characterized as being water soluble and providing a viscosity of from about 200 to about 2,000 cps when present at a concentration of 25 weight percent.

In preparing the polyureas a wide variety of polyisocyanates can be employed. However, it is preferred to use urethane prepolymers as the polyisocyanate. Such prepolymers are essentially linear polyoxyalkylene polyols capped with TDI and other similar "monomeric" polyisocyanates. The linear prepolymers are described in group A above under the discussion of prepolymers.

Examples of polyamines useful herein include, without limitation, molecules having two or more amine members including hydrazine. These amine members may be ordinarily attached to either aliphatic or aromatic molecules. Typically, the polyamines are those molecules having from about 2 to about 23 pendant amines. Specific examples of polyamines include but are not limited to materials such as diethylenetriamine, triethylene-tetramine, tetraethylenepentamine, polyethyleneimine, tolylene-2,4,6-triamine, ethylene diamine, N,N'-dimethylethylene diamine, trimethylenediamine, tetramethylenediamine, pentamethylenediamine, hexamethylene-diamine, and the like. Other suitable polyamines include propylene diamine, dipropylene triamine, 1,3 diamino butane and the like. They are considered as members of the broad class of alkylene polyamines. Ordinarily the word "polyamine" is employed to include diamines, as well as amines having three or more nitrogens.

The following examples are set forth to illustrate the foams of the invention and preparation thereof.

I. PREPARATION OF PREPOLYMER

A. A prepolymer was prepared by admixing trimethylolpropane (TMOP) with polyethylene glycol (PEG - 1,000). The mole ratio of PEG/TMOP was 2:1. The polyol mixture was admixed with sufficient toluene diisocyanate (TDI) to react with about 95% of the hydroxyl groups in the polyol. The reaction was carried out at 60° C. Following the capping reaction a second addition of TDI was made sufficient to react with about 15% of the hydroxyl groups originally present in the polyol, thereby providing a 10% excess of TDI. Following the second addition the reaction mixture was maintained at a temperature of about 60° C. for a 2-hour period.

B. One mole of ethylene glycol was blended with 8.65 moles of TDI and allowed to react completely therewith. Subsequently 2 moles of PEG - 1,000 and 1 mole of TMOP were blended together and admixed with the TDI/ethylene glycol blend. The resulting mixture was heated at about 60° C. for about 2 hours. Following the capping reaction, 1.05 moles of TDI were blended into the capped reaction mixture. Following a heating period at 60° C., the viscosity of the blend was about 37,000 centipoise (cps) at 25° C.

II. PREPARATION OF AQUEOUS POLYAMINE

A. One mole of PEG - 1,000 was outgassed at 110° C. (1-10 Torr) for 1-2 hours. 2.2 moles of TDI were added with stirring and the mixture was heated at 60° C. for 3-5 hours to cap the PEG - 1,000 (NCO number 1.48-1.70 meq/g).

One mole of diethylene triamine dissolved in 500 grams of methylethyl ketone (MEK) was heated at 70° C. for 1 hour and blended with 0.75 moles of the capped PEG - 1,000 prepolymer dissolved in 1,000 grams of MEK. The reaction mixture was cooled to about 10° C. and stirring was continued for about 1 hour.

Between 1,200 and 1,400 grams of MEK were removed by distillation and replaced with about 2,000 grams of water to yield an aqueous solution containing about 25 weight percent solids (water soluble, essentially linear poly(amino)urea). The aqueous solution was warmed to 60° C. and 1.8 moles of epichlorohydrin were added with stirring. After about 3 hours the viscosity obtained was about 500-600 cps (at 25° C.) and 2.1 moles of glacial acetic acid were added to prevent further reaction.

B. The formulation prepared in II A above can be modified to base the amounts of reagents employed on values actually determined. It has been found desirable to increase the amount of amine employed so that the ratio of isocyanate equivalents/amine equivalents is about ½ based on the actual NCO equivalents determined after completion of the capping reaction. Following reaction with epichlorohydrin the molecular weight of the product is about 4-6,000; pH is about 4-6; viscosity is about 500-600 cps but generally drops to the range of 300-500 after addition of acetic acid. The percent solids is about 24-26 percent.

By varying the ratios of amine, isocyanate and crosslinking agent employed, as well as using different reagents as those described in II A and II B above, it is possible to achieve products having a molecular weight of from about 2,000 to about 10,000; viscosity of 200-20,000 cps and solids content of 5-45 percent. As defined above, solids content is the amount of materials other than water present in the product and includes undissolved as well as soluble materials. The isocyanates, polyamines, and crosslinking agents can be varied as described previously. One modification has been to employ isophorone diisocyanate rather than TDI.

III. IMPROVED WET STRENGTH FOAMS

In a series of runs, foams of the invention were prepared using varying amounts of an aqueous solution of the partially crosslinked polyurea adduct prepared as in II A above blended with various amounts of a "Base". The adduct solution was formulated to contain about 10% total solids in $H_2O$. The Base was an aqueous solution of surfactants. The amounts of the 10% adduct solution and Base employed are set forth in Table I. In Table I the combined polyurea adduct/Base solution is referred to as the "Aqueous Polyurea Solution". At the amounts employed all ingredients were soluble in the water.

Varying amounts of the aqueous adduct solution (i.e. Base + adduct) were subsequently combined with the prepolymer product of I A above. The blends were admixed and allowed to foam. The relative amounts of adduct solution and prepolymer and physical properties of the resulting foams are set forth in Table I.

TABLE I

| Run | Aqueous Polyurea Solution, Parts/Hundred of Prepolymer | | Density Lbs/Ft³ (Dry) | Tear Strength (lbs./linear inch) | | Tensile Strength psi (at failure) | | | Elongation at Failure % | | |
|---|---|---|---|---|---|---|---|---|---|---|---|
| | Base[a] | Aqueous Polyurea Adduct | | Wet | t/d[b] | Dry | Wet | T/d[b] | Dry | Wet | (T/d × E[b]) |
| 1 | SSR | 100 | — | 5.3 | 0.75 | 0.14 | 24 | 9 | 1.7 | 168 | 83 | 140 |
| 2 | | 95 | 5 | 4.3 | .80 | .19 | 21 | 11 | 2.6 | 180 | 89 | 230 |
| 3 | | 90 | 10 | 4.6 | .84 | .18 | 25 | 12 | 2.6 | 198 | 101 | 260 |
| 4 | | 85 | 15 | 4.4 | .90 | .20 | 24 | 17 | 3.9 | 178 | 112 | 430 |
| 5 | | 100 | — | 6.4 | .90 | .14 | 25 | 13 | 2.0 | 219 | 116 | 240 |

TABLE I-continued

| Run | Base[a] | Aqueous Polyurea Solution, Parts/Hundred of Prepolymer | | Density Lbs/Ft³ (Dry) | Tear Strength (lbs./linear inch) | | Tensile Strength psi (at failure) | | | Elongation at Failure % | | |
|---|---|---|---|---|---|---|---|---|---|---|---|---|
| | | Aqueous Poly- urea Adduct | | | Wet | t/d[b] | Dry | Wet | T/d[b] | Dry | Wet | (T/d × E[b]) |
| 6 | | 80 | 20 | 4.2 | .83 | .20 | 24 | 13 | 3.1 | 218 | 114 | 350 |
| 7 | RAF | 100 | | 5.1 | 1.3 | .25 | 18 | 12 | 2.3 | 163 | 102 | 240 |
| 8 | | 90 | 10 | 5.1 | 2.1 | .41 | 30 | 17 | 3.3 | 201 | 124 | 410 |
| 9 | | 85 | 15 | 5.6 | 2.6 | .46 | 31 | 18 | 3.2 | 215 | 140 | 450 |
| 10 | | 80 | 20 | 7.1 | 2.7 | .38 | 40 | 20 | 2.8 | 238 | 118 | 330 |
| 11 | B-72 | 100 | — | 3.9 | .32 | .08 | 5 | 3 | 0.8 | 86 | 69 | 53 |
| 12 | | 85 | 15 | 3.9 | .76 | .20 | 22 | 12 | 3.1 | 143 | 88 | 270 |

[a]SSR = Aqueous solution containing, on a weight basis 0.94% Pluronic ®L-62, 0.125% Pluronic P-75 and 0.5% Calcatone Green. (Pluronic L-62 = a linear polyoxyethylene/polyoxypropylene polyol available from BASF Wyandotte having 20% oxyethylene units) (Pluronic L-75 = a linear polyoxyethylene/polyoxypropylene polyol available from BASF Wyandotte having 50% oxyethylene units)
RAF = Aqueous solution containing 2.0% Pluronic L-62 on a weight basis.
B-72 = Aqueous solution containing 2.0% Brij ®72 (Brij 72 = polyoxyethylene(2)stearyl ether adduct available from Atlas Chemical Industries, Inc.)
[b]t/d = Tear Strength (wet)/density (dry); Tear strength was measured by ASTM D-1564.
T/d = Tensile Strength (wet)/density (dry); Tensile strength was measured by ASTM D-882 modified to provide a constant strain rate of 50%/minute.
(T/d) × E = (T/d) × Elongation (wet).

What is claimed is:

1. A method for preparing a hydrophilic foam having good wet strength comprising reacting, under foam-forming conditions:
   (A) a urethane prepolymer formed by capping a hydrophilic oxyalkylene polyol with an isocyanate; and
   (B) an aqueous dispersion containing from about 0.1 to about 5 parts of weight based on the weight of the prepolymer of an essentially linear polyurea reacted with a crosslinking agent.

2. A method as in claim 1 wherein the polyurea is the reaction product of a polyamine and a hydrophilic urethane prepolymer.

3. A method as in claim 1 wherein the reaction product of the polyurea with the crosslinking agent is water soluble and characterized as providing a viscosity of from about 200 to about 15,000 cps when dissolved in water at a concentration of 25 weight percent.

4. A method as in claim 1 wherein the crosslinking agent is epichlorohydrin.

5. A method as in claim 1 wherein the crosslinking agent is formalin.

6. A method as in claim 1 wherein the polyol portion of the prepolymer contains at least 40 mole percent of oxyethylene units.

7. A method as in claim 1 wherein the polyol portion of the prepolymer contains at least 75 mole percent of oxyethylene units.

8. A method as in claim 1 wherein the aqueous polyurea dispersion additionally has hydrophilic fibers dispersed therein.

9. A hydrophilic foam comprising the reaction product of:
   (A) a urethane prepolymer formed by capping a hydrophilic oxyalkylene polyol with an isocyanate; and
   (B) an aqueous dispersion containing from about 0.1 to about 5 parts of weight based on the weight of the prepolymer of an essentially linear polyurea reacted with a crosslinking agent.

10. A foam as in claim 9 wherein the polyurea is the reaction product of a polyamine and a hydrophilic urethane prepolymer.

11. A foam as in claim 9 wherein the reaction product of the polyurea with the crosslinking agent is water soluble and characterized as providing a viscosity of from about 200 to about 15,000 cps when dissolved in water at a concentration of 25 weight percent.

12. A foam as in claim 9 wherein the crosslinking agent is epichlorohydrin.

13. A foam as in claim 9 wherein the crosslinking agent is formalin.

14. A foam as in claim 9 wherein the polyol portion of the prepolymer contains at least 40 mole percent of oxyethylene units.

15. A foam as in claim 9 wherein the polyol portion of the prepolymer contains at least 75 mole percent of oxyethylene units.

16. A foam as in claim 9 wherein the aqueous polyurea dispersion additionally has hydrophilic fibers dispersed therein.

* * * * *